3,409,279
METHOD OF CONTACTING LIQUIDS AND GASES

William Joseph Metrailer, Baton Rouge, La., assignor to Esso Research and Engineering Company, a corporation of Delaware
No Drawing. Continuation-in-part of application Ser. No. 330,869, Dec. 16, 1963. This application Oct. 6, 1966, Ser. No. 584,643
6 Claims. (Cl. 261—94)

ABSTRACT OF THE DISCLOSURE

The contacting of a discontinuous phase of gas with a continuous phase of liquid is improved by using contactors which have densities sufficiently close to the density of the liquid to allow them to circulate and move about freely in the continuous liquid phase.

---

This is a continuation-in-part of U.S. application Ser. No. 330,869, filed Dec. 16, 1963, now Patent No. 3,293,171.

This invention relates to contacting liquids and gases. More particularly, it relates to contacting a gas and liquid in a multiphase system wherein the liquid phase is continuous and the gas phase is discontinuous.

It is known to contact liquids and gases in two-phase heterogeneous systems. Numerous stripping, scrubbing and rectification processes involve such system in which a gas is introduced into a vessel containing the liquid to be contacted and bubbles of the gas pass upwardly through the liquid. Various devices and techniques have been used to improve liquid-gas contacting processes by breaking up large gas bubbles, improving mixing of the two phases and minimizing liquid or gas channeling. Examples of such devices are trays, grids, bubble caps and a wide variety of randomly-packed contactors such as rings, saddles, spirals, spheres and tubes.

In a continuous process contacting is achieved generally by passing the liquid downwardly through a packed column countercurrent to the flow of an ascending gas introduced at the bottom of the column. When the gas constitutes the continuous phase and the liquid is a discontinuous phase, contacting problems are lessened. However, when the downcoming liquid stream is a continuous phase and the gas phase consists of discontinuous bubbles, serious problems are encountered.

These problems are particularly acute in the system having a continous liquid phase when the liquid or gas rates are relatively high because of the tendency of the column to flood. The flooding point is reached when the gas velocity is sufficiently high with respect to the liquid feed rate that a liquid layer begins to build up on top of the packing. This phenomenon results from a sudden increase in pressure drop through the packing as the flow rates become excessive. Thus, for any given packing, when the mass flow rates are such that the pressure drop for flow through the packing is greater than the static head of liquid in the column, the liquid stops flowing downwardly and builds up on top of the packing. This upsets contacting operations and causes pressure surging, inefficient contacting and eventually can force the column operation to be shut down. Moreover, it is often necessary to change either the type or size of packing, or both, for each range of flow rates used in a particular column in order to avoid flooding. Also, even in the most carefully packed columns there will still be some channeling and by-passing of the liquids and gases, which greatly reduces the contacting efficiency. With conventional packing or contacting devices, even when the gas by-passing and channeling effects are minimized at one set of conditions, they often recur at other operating conditions.

It has long been felt desirable to develop a gas-liquid contacting process which is sufficiently flexible to be useful in a system having a continuous liquid phase and a discontinuous gas phase and which is operable over a wide range of flow rates without flooding while simultaneously being highly resistant to gas by-passing and gas or liquid channeling.

Such a process can now be carried out in accordance with the present invention.

This invention contemplates a process of contacting a liquid and gas wherein the gas is passed upwardly through a contacting zone containing a continuous liquid phase, a discontinuous gas phase and a plurality of contactors having densities sufficiently close to the density of the liquid phase to enable the contactors to move about freely in the contacting zone.

When contactors have densities selected in accordance with this invention, they circulate in suspension through the heterogeneous system of gas and liquid, breaking up gas bubbles, thereby improving the contacting and reducing or eliminating by-passing and channeling by the constant changing of contactor positions.

In most gas-liquid contacting operations the contactors will have densities from about 50 to about 120% of the density of the liquid. Preferably, at least a major portion of the contactors will have densities in the range from about 90 to 110% of the density of the liquid. The precise densities desired for the contactors depend on the gas and liquid mass flow rates, viscosities and contactor shape. Thus, when the downward velocity of the liquid is high or when the liquid is quite viscous, a relatively low density contactor is desirable to prevent it from being carried to the bottom of the contacting zone. Conversely, when the gas rate is high and the liquid rate is low, on in a batch system where the liquid does not flow, it is desirable to use relatively high density contactors so that they will not all float to the top and result in ineffective gas-liquid contacting in the lower portions of the contacting zone.

Maximum flexibility can be achieved in accordance with this invention by using contactors having a range of densities so that some will float to the top of the continuous liquid phase, others will circulate upwardly and downwardly in suspension throughout the liquid, and still others will go to the bottom of the contacting zone to encounter and break up incoming gas bubbles.

To achieve the most efficient contacting and greatest flexibility, a mixture of light, intermediate and heavy contactors is employed. The light contactors should constitute about 5 to 20% of the total contactors (based on bulk contactor volume) and should have densities in the range from 75 to 95% of the liquid density. The intermediate density contactors should constitute about 60 to 90% of the total and have densities, greater than those of the light contactors, in the range from about 90 to 105% of the liquid density. The heavy contactors should have densities, greater than the intermediate contactors, in the range from about 100 to 120% of the liquid density and should constitute about 5 to 20% of the total contactors.

Such spread of densities also serves to make the contacting zone highly resistant to flooding. For example, when flooding conditions are approached and a dense liquid layer forms above the contactor zone, the contactors merely spread out further by moving in suspension up into such liquid layer. By spreading out in this manner the pressure drop through the contactors is decreased, and consequently flooding is avoided. Thus, the system tends to be self-compensating to resist flooding.

Any conventional gas-liquid contacting conditions can be used provided, of course, that they include a continuous liquid phase. Similarly, the type of vessel, column, tower or reactor used in the process of this invention is not critical. Vacuum, atmospheric and superatmospheric pressures can be employed. Chemical reactions can be carried out in the contacting zone as well as physical interactions, e.g., absorption-desorption processes. The moving contactors of this invention also provide greatly improved contacting in a three-phase system where a gas is contacted with a slurry of liquid and solids such as in an olefin polymerization process having an insoluble solid catalyst or product. In such case the contactor densities are selected relative to the slurry density.

Conventional sizes and forms of contactors such as Rachig rings, Berl saddles, spheres, etc., can be used. In any case, the contactors selected must have a density in the desired range according to this invention. A wide range of plastic materials or hollow structures, such as blown aluminum or other metals, are convenient materials for making contactors since they can be made with densities in the range of most liquid-gas heterogeneous systems.

The invention will be better understood by reference to the following examples and demonstrations.

Example 1

A glass column 5 inches in diameter and 40 inches high is filled to a height of 20 inches with equal volumes of ½ inch Raschig rings made of polyethylene, polypropylene and nylon having densities ranging from about .9 to 1.2 g./cc. Water is added to the column to a height of 18 inches. Air is introduced at the rate of 114 lbs./hr./ft.$^2$ into the bottom of the column. Air retained in the water causes an increase in the volume of the heterogeneous gas-liquid system, which results in a rise in the liquid level to a height of 23 inches. The lower density Rachig rings can be seen in violent agitation in the upper portion of the column, and the higher density nylon Rachig rings are seen moving around in the lower portion colliding with, and dispersing, the incoming gas bubbles. No channeling or by-passing of large gas bubbles can be seen. The increase in height is due to the retention of 15 volume percent air in the system. The air rate is further increased to 580 lbs./hr./ft.$^2$ mass flow rate. Further expansion of the heterogeneous gas-liquid system occurs until the level reaches 29 inches. The contactors move violently throughout the entire system.

In sharp contrast, when ½ inch steel Raschig rings are used, they do not move around at all in the column. When air is introduced at 114 lbs./hr./ft.$^2$ mass flow rate, the increase in the liquid-gas system volume is only 50% of that obtained using the moving plastic contactors, this indicating vastly inferior gas retention (which is a reliable index of contacting) using the heavy fixed contactors. Visual gas by-passing in large bubbles and channeling are in evidence with the fixed contactors. Moreover, when the air rate is increased to 580 lbs./hr./ft.$^2$ mass flow rate, which is above normal flooding velocity, most of the liquid is forced out of the contactors and poor contacting is obtained. Similar inferior results are obtained when the plastic contactors are used but are restrained from moving by a screen in the column holding them in position.

Example 2

This example is carried out precisely as in Example 1 except that the plastic contactors are selected in the proportions and densities shown below:

| Contactor | Bulk Volume, Percent | Density, g./cc. |
|---|---|---|
| Polyethylene | 10 | 0.91 |
| Polypropylene | 75 | 0.95 |
| Nylon | 15 | 1.2 |

When air is introduced at the rate of 114 lbs./hr./ft.$^2$ outstanding gas retention is achieved, and the liquid level in the column rises to 24 inches.

As will be apparent to one skilled in the art, innumerable variations of this invention are possible, and the invention is not intended to be limited by the preceding examples, which are illustrative. Many combinations of shapes and sizes of contactors are possible. Contactors having densities as low as 50% of the liquid density are effective at very high liquid downward velocities, while contactors with densities as high as 120% of the liquid density are effective at very high upward gas rates and low downcoming liquid rates. Thus, improvements over fixed packing can be achieved throughout this density range even though best results are achieved using the preferred ranges described herein.

What is claimed is:

1. An improved process for contacting liquid and gas comprising passing the gas upwardly through a contacting zone containing
    (a) a heterogeneous system comprising a continuous phase of said liquid and a discontinuous phase of said gas, and
    (b) contactors having densities in the range from about 50 to about 120% of the density of said liquid and sufficiently close to the density of said liquid to allow said contactors to circulate and move about freely in said contacting zone.

2. The process of claim 1 wherein the liquid is added continuously to the top of said contacting zone and the gas is added continuously to the bottom of said zone.

3. The process of claim 1 wherein at least a major portion of the contactors have densities within the range from about 90 to about 110% of the density of the liquid.

4. In a process for contacting gas and liquid wherein said gas is passed upwardly as a discontinuous phase through a continuous liquid phase in the presence of gas-liquid contactors, the improvement comprising employing contactors at least a major portion of which have densities within the range of from about 90 to 110% of the density of the liquid phase.

5. The process of claim 4 wherein about 5 to 20% of said contactors have densities in the range from about 75 to 90% of said liquid density, about 60 to 90% of the contactors have densities in the range from about 90 to 105% of the liquid density, and about 5 to 20% of the contactors have densities in the range from about 100 to 120% of the liquid density.

6. An improved process for contacting a gas with a liquid-solid slurry comprising passing the gas upwardly as a discontinuous phase through a contacting zone containing a continuous phase of said slurry and contactors having densities in the range from about 50 to about 120% of the density of said liquid and sufficiently close to the density of said slurry to allow said contactors to move about freely in said contacting zone.

References Cited

UNITED STATES PATENTS

| | | | |
|---|---|---|---|
| 1,326,174 | 12/1919 | Borcherdt | 261—96 |
| 2,088,497 | 6/1937 | Tijmstra | 261—94 |
| 2,431,455 | 11/1947 | Blanding | 261—94 X |
| 2,470,438 | 5/1949 | Jackson et al. | 261—98 X |
| 3,118,957 | 1/1964 | Yerzley | 261—97 X |
| 3,122,594 | 2/1964 | Kielback | 261—94 X |
| 3,219,324 | 11/1965 | Williams et al. | 261—95 |

FOREIGN PATENTS 646,455 8/1962 Canada.
1,020,483 2/1966 Great Britain.

HARRY B. THORNTON, *Primary Examiner.*

TIM R. MILES, *Assistant Examiner.*